(No Model.)
J. BENDER.
NUT LOCK.
No. 482,610.  Patented Sept. 13, 1892.
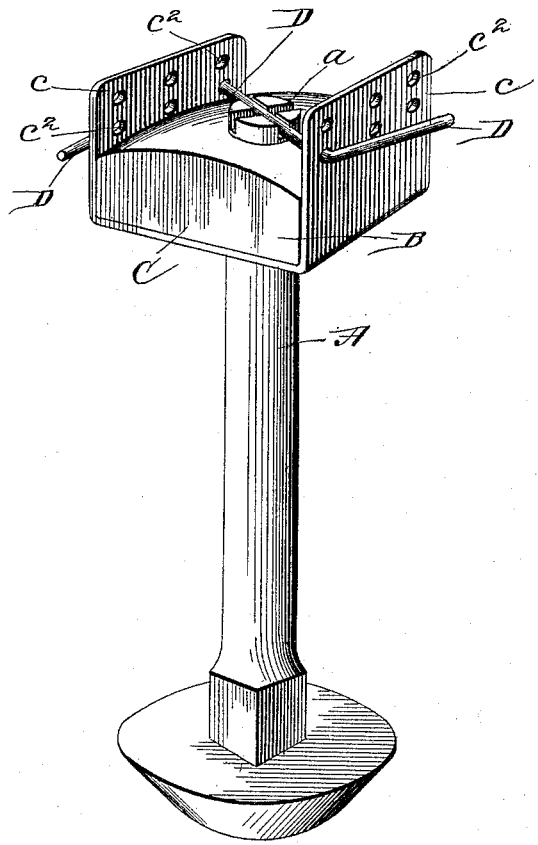
Witnesses
Chas. La Porte
W. H. Pumphrey
Inventor
John Bender
By Myers & Co.
Attorneys

UNITED STATES PATENT OFFICE.

JOHN BENDER, OF ELIZABETHVILLE, PENNSYLVANIA.

NUT-LOCK.

SPECIFICATION forming part of Letters Patent No. 482,610, dated September 13, 1892.

Application filed March 19, 1892. Serial No. 425,567. (No model.)

*To all whom it may concern:*

Be it known that I, JOHN BENDER, a citizen of the United States of America, residing at Elizabethville, in the county of Dauphin and State of Pennsylvania, have invented certain new and useful Improvements in Nut-Locks, of which the following is a specification, reference being had therein to the accompanying drawing.

This invention relates to nut-locks, more particularly to that class wherein a washer is employed in combination with a wire locking-piece.

The object of the invention is to produce a novel article of manufacture which shall be at once simple, convenient, and comparatively inexpensive; furthermore, in the employment of such peculiar construction whereby the locking or unlocking of the nut may be readily and easily accomplished in a satisfactory and efficient manner without the aid of specially-constructed tools.

With these objects in view the invention consists in a nut-lock comprising any form of bolt provided with cross-slots above the thread, the usual nut, a washer having upturned apertured ears, and a wire locking-piece adapted to be passed through apertures diametrically opposite each other and through one of the slots formed in the bolt.

Furthermore, the invention consists in various novel details of construction hereinafter more particularly described, and pointed out in the claims.

I have illustrated by a view in perspective a form of device embodying my improvement.

In the drawing, A indicates the bolt, having formed above the threads cross-slots $a$. B is a nut of ordinary form inclosed between the ears $c$ of a washer C. This washer C consists of a plate cut or stamped to the size of the nut, and provided with extensions which are adapted to be turned up at right angles to the base portion thereof to form ears $c$, having apertures $c^2$. To lock the nut in position, a wire locking-key D, passing through an aperture $c^2$ of one of the ears, engages a slot $a$ of the bolt and enters an aperture of the opposite ear when the ends are bent to hug the faces of the ears, as shown in the drawing, or in any other suitable manner, to prevent a disengagement or loosening of the parts.

It will be readily understood that in the construction of the device various changes may be made without materially departing from the general idea herein shown and described.

Having fully described my invention, what I claim, and desire to secure by Letters Patent, is—

1. In a nut-lock comprising a bolt having slots formed at the end, the nut on the bolt, the washer provided with apertured ears adapted to inclose the sides of said nut, and a locking-key engaging a slot of the bolt and the apertures of the ears to secure the bolt, substantially as and for the purpose described.

2. In a nut-lock comprising a bolt A, having cross-slots $a$ formed in the end, the nut B on the bolt, the washer C, provided with upturned apertured ears $c$, and a pliable wire locking-key D, engaging a slot $a$ of the bolt and apertures $c^2$ of the ears to secure the bolt, substantially as and for the purpose described.

In testimony whereof I affix my signature in presence of two witnesses.

JOHN BENDER.

Witnesses:
E. W. LYTER,
WM. H. LYTER.